United States Patent [19]

Rogers

[11] 3,997,980
[45] Dec. 21, 1976

[54] GLOBE AND MEASURING DEVICE

[75] Inventor: Richard K. Rogers, Falls Church, Va.

[73] Assignee: National Geographic Society, Washington, D.C.

[22] Filed: Nov. 5, 1975

[21] Appl. No.: 628,911

[52] U.S. Cl. .............................................. 35/46 R
[51] Int. Cl.² ........................................ G09B 27/08
[58] Field of Search .................... 35/46 R, 46 A, 47

[56] References Cited

UNITED STATES PATENTS

| | | | |
|---|---|---|---|
| 1,959,601 | 5/1934 | Schulsc | 35/46 R X |
| 2,374,788 | 5/1945 | Steele | 35/46 R X |
| 2,405,418 | 8/1946 | Fukal | 35/46 R |
| 2,546,764 | 3/1951 | McHose | 35/46 R X |
| 3,052,993 | 9/1962 | Olson | 35/46 R |
| 3,100,353 | 8/1963 | Chamberlin | 35/46 R |
| 3,903,618 | 9/1975 | Rogers | 35/46 R |

*Primary Examiner*—William H. Grib
*Attorney, Agent, or Firm*—Dos T. Hatfield

[57] ABSTRACT

A geographically configured globe is provided with a transparent overlay globe geometer segment shaped to closely overlay the globe surface and is adapted to be removably and pivotally secured to the globe at a pivot point of the overlay. A transparent circular longitude degree amd time disk is pivotally secured to the overlay assembly at the pivot point thereof and the overlay assembly may be generally pie-shaped with the pivot point end enlarged to a circular configuration about the pivot point.

5 Claims, 5 Drawing Figures

GLOBE AND MEASURING DEVICE

BACKGROUND OF THE INVENTION AND PRIOR ART

Globes with geometer measuring devices are known to be decorative and to be useful as educational and scientific tools. Examples of such globe and measuring assemblies are shown by the prior U.S. Pat. Nos. 3,100,353 and 3,903,618 assigned to the National Geographic Society to which the present application for patent is also assigned. Other pertinent prior art is represented by Olson U.S. Pat. No. 3,052,993 and Fukal U.S. Pat. No. 2,405,418.

None of the patents of which applicant is aware discloses an indicia marked overlay assembly of transparent material shaped to closely overlay the globe surface and adapted to be removably and pivotally secured to the globe, the overlay assembly also having a pivotal longitude degree and time disk secured to the assembly at the pivot point thereof.

SUMMARY OF THE INVENTION

It is believed that the present invention has been adequately summarized in the above paragraphs for abstracting the invention and describing the background of the invention in relation to the prior art. Details of the invention will be found in the following description of a preferred embodiment.

BRIEF DESCRIPTION OF THE INVENTION

DETAILED DESCRIPTION OF A PREFERRED EMBODIMENT

Figure 1:
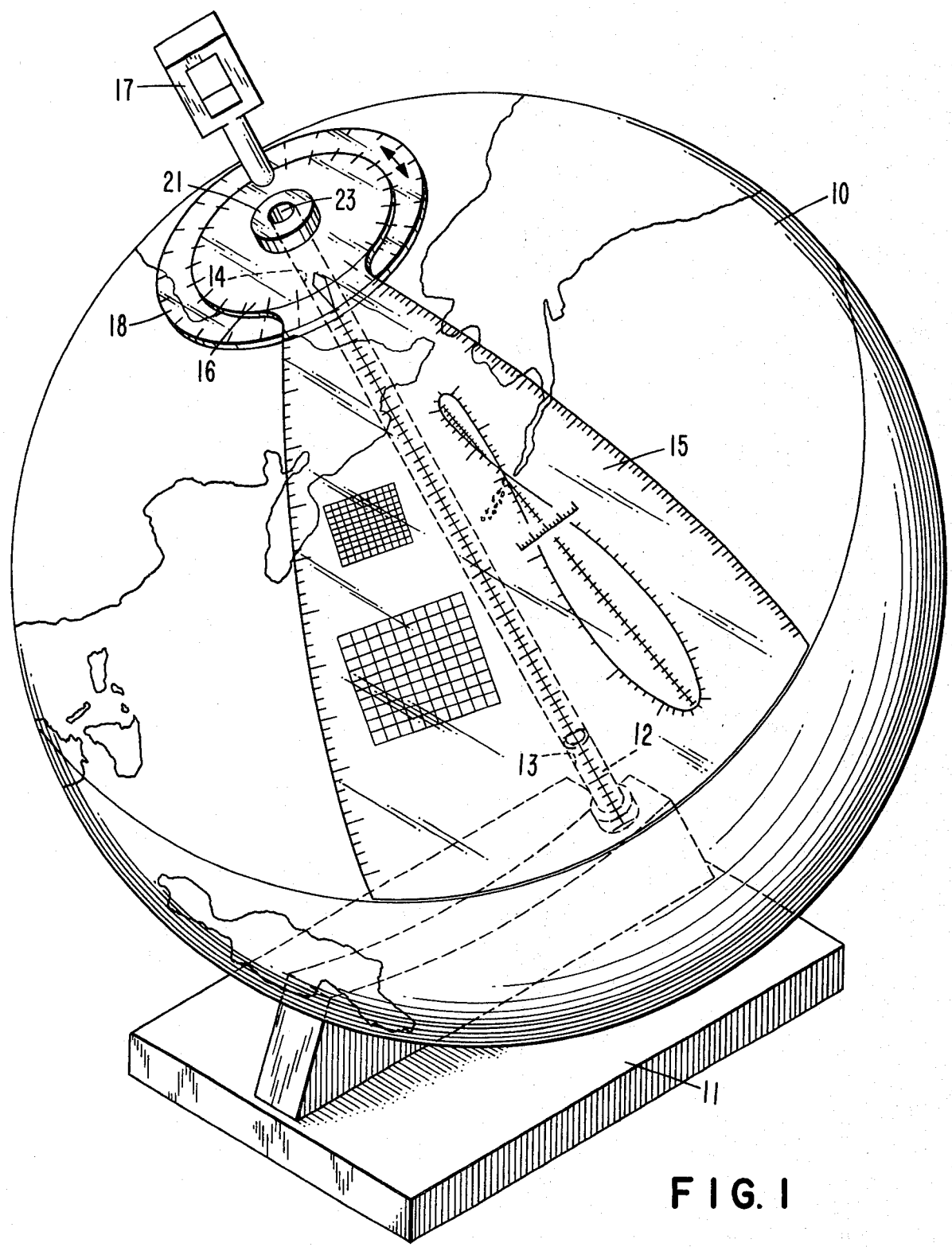
FIG. 1 is an overall perspective view of the globe and measuring device resting on a removable pivot on a globe stand.
Figure 2:
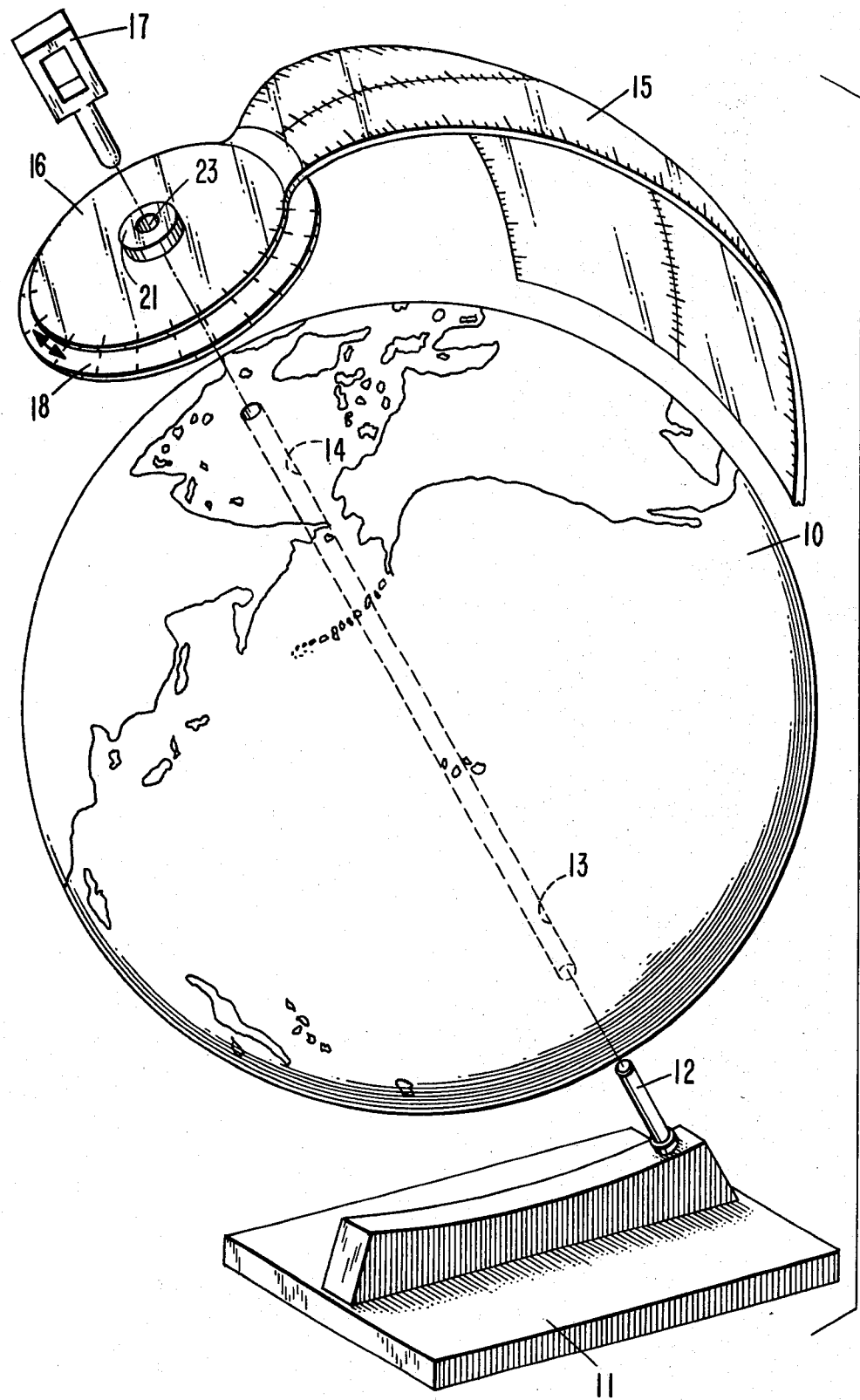
FIG. 2 is an exploded view similar to FIG. 1 but with the globe separated from the globe stand and the overlay assembly separated from the globe.
Figure 3:
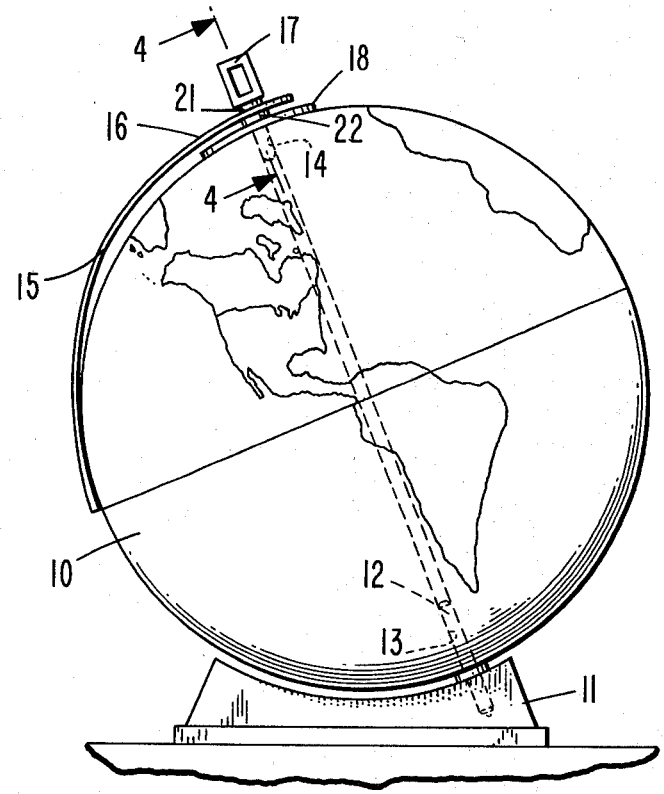
FIG. 3 is a side view showing the overlying shape of the measuring overlay when secured to the globe.

Referring to FIGS. 1 to 3 of the drawings, the geographically marked globe 10 is removably and pivotally secured to the globe stand 11 at one pole end by a pivot pin 12 to be received in a globe aperture, such as shown at 13 or 14 at either pole of the globe, but preferably the south pole. For best results, the pivot pin 12 may be inclined as shown. The globe stand 11 may be formed of any suitable material, such as decorative grained wood, and is configured as shown to the shape of the globe surface.

The measurement overlay of the invention is formed of transparent material and is shown at 15 to be provided with suitable measuring indicia, the nature and purpose of which have been fully described in the prior National Geographic Society U.S. Pat. No. 3,100,353. The overlay assembly 15 is provided with a pivot end 16 at its wedge point and adapted to be removably and pivotally secured to a pole position of the globe with a removable pivot pin 17 which is preferably used at the north pole of the globe and received in the globe aperture 14. Also, pivotally secured to the overlay 15 at its pivot point 16, in accordance with the invention, is a circular disk 18 of transparent material having degree and time markings or the like thereon. Both the degree disk 18 and the overlay 15 are thus independently rotatable about the globe when assembled to the globe.

Figure 4:
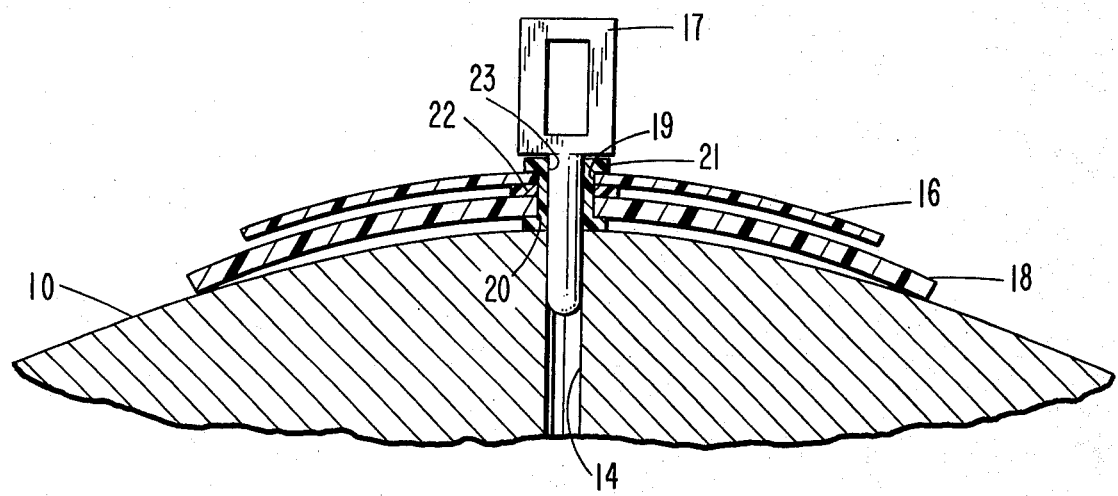
FIG. 4 is an enlarged fragmentary detail of the pivot assembly for the overlay.

The details of a presently preferred arrangement for rotatably securing the assembly of the degree and time disk 18 to the overlay segment 15 are shown by FIGS. 3 and 4 of the drawings. It will be seen that the pivot end 16 of the overlay 15 is provided with an aperture 19 in alignment with the aperture 20 extending through the degree and time disk 18. A cylindrical sleeve assembly washer 21 is passed through both apertures 19,20, to be retained therein in any suitable manner. The pivot pin 17 may then be removably received through the aperture 23 of the cylindrical washer 21 and into the aperture 13 or 14 of the globe 10. As shown by the detail of FIG. 4, a washer 22 may be positioned between the overlay pivot end 16 and the degree disk 18 to assure the independent rotatability of the degree disk.

Figure 5:
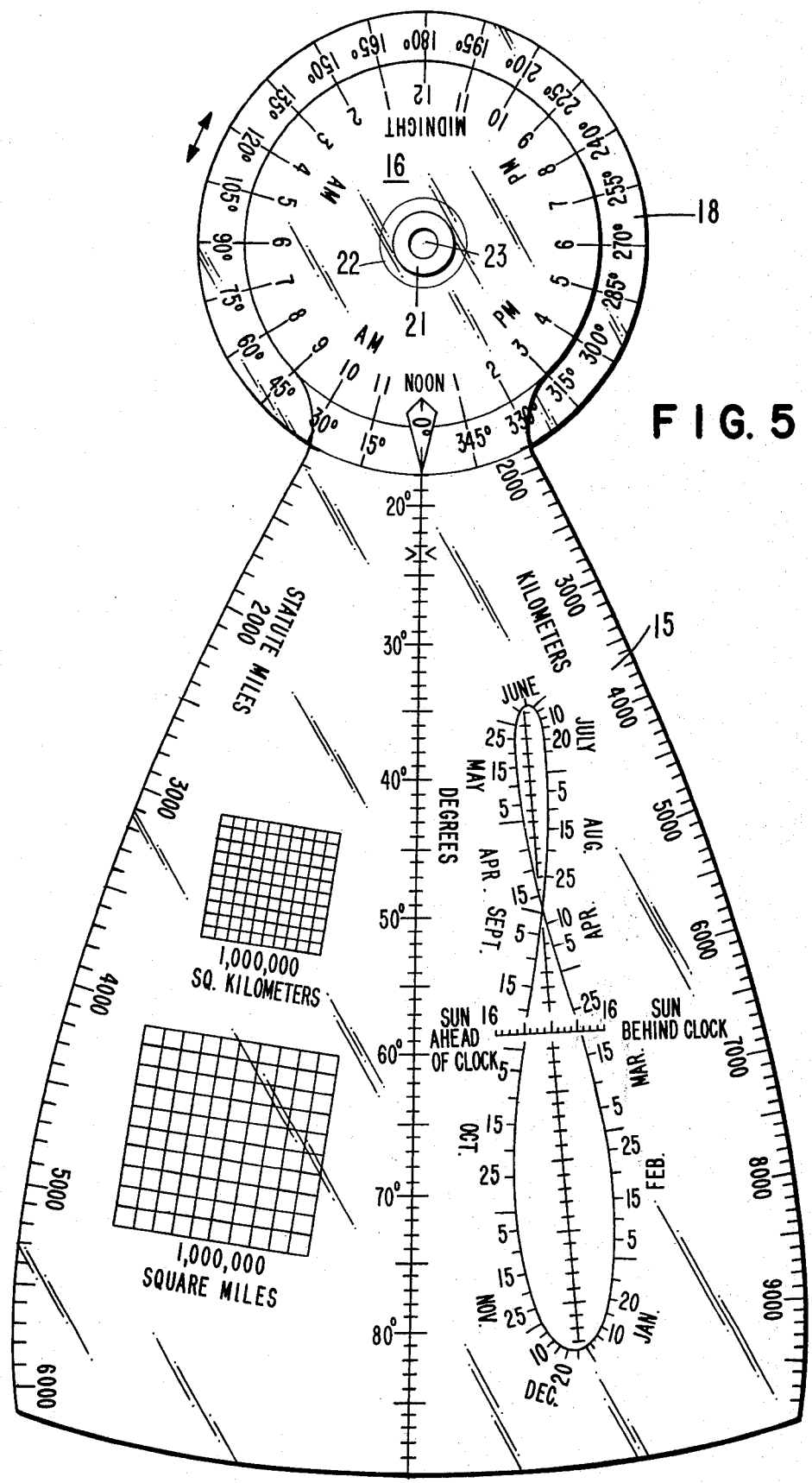
FIG. 5 is a planar view of the overlay assembly with typical indicia markings.

Referring now to FIGS. 3 and 5 of the drawings, it will be seen that the preferred form of the invention requires that the overlay segment 15 be generally pie-shaped, extending to the equator of the globe when assembled thereon. The pivotal end 16 of the pie-shaped overlay segment 15 is enlarged to a circular configuration generally about the pivot aperture 19 at one point of the pie-shaped overlay segment. The suitable indicia, such as time and degree markings, on the degree disk 18 in turn may cooperate with other markings on the overlay segment and/or the globe to function as a geometer. It will be noted from FIG. 1 of the drawings, that each side of the segment extending from the pole pivot point is provided with respective different scale distance markings such as, for example, kilometers for one side and statute miles for the other side. In addition, other distance markings, such as nautical miles, could be imprinted on the pre-shaped segment overlay to extend from the pole pivot point intermediate the two side edges.

Various modifications within the spirit of the invention will be obvious to those skilled in the art.

I claim:

1. A combination globe and measuring device comprising, a globe with geographical markings thereon, a transparent overlay assembly in the form of a substantially pie-shaped segment of the globe and shaped to closely interfit and overlay the globe surface, the wedge point of said pie-shaped segment adapted to overlie a pole position of the globe to comprise a pole point of the segment, measuring indicia on said overlay including respective different distance scale markings imprinted along each side edge of the pie-shaped segment from the pole point of the segment, and pivot means to removably and pivotally secure the pole point of said overlay segment to said globe.

2. The invention of claim 1 in which said pole point end of said overlay assembly is enlarged to a generally circular configuration about the pole point.

3. The invention of claim 2 in which a circular disk of transparent material having time and degree markings thereon is pivotally secured to the overlay assembly at the pole point thereof.

4. The invention of claim 3 in which the means to removably secure said overlay assembly to said globe is comprised of a removable pin to be received in an aperture at one pole of the globe.

5. The invention of claim 4 in which the opposite pole of said globe is adapted to be removably and pivotally secured to a globe stand.

* * * * *